Feb. 13, 1951   R. A. KATZ   2,541,702
RECEPTACLE FOR AUTOMOBILE TRUNK COMPARTMENT
Filed Dec. 19, 1949

INVENTOR.
Robert A. Katz
BY
William F. Nicke
ATTORNEY

Patented Feb. 13, 1951

2,541,702

UNITED STATES PATENT OFFICE 2,541,702

RECEPTACLE FOR AUTOMOBILE TRUNK COMPARTMENTS

Robert A. Katz, Brooklyn, N. Y.

Application December 19, 1949, Serial No. 133,878

3 Claims. (Cl. 224—42.42)

My invention is an improvement in storage receptacles; especially storage receptacles to be carried by motor vehicles, such as passenger automobiles.

It is well known that such motor cars are built with a trunk space, usually located at the rear of the body, and kept closed by a hinged door. The trunk space is clear inside and large enough to hold a spare tire, bag of tools and other articles, which, except for the tire are merely laid loose on the floor and slide about when the car is in motion. An important object of my invention is to provide a receptacle that can be mounted in the trunk space, made fast therein, and which will keep tools and other objects in an orderly arrangement, while leaving enough room in the trunk space for a spare tire and such pieces of baggage as may have to be stored therein.

Another object is to provide a receptacle for the trunk space of a pleasure automobile that can easily be secured against movement and disconnected for removal whenever desired.

The nature and advantages of the invention are made clear in the following description, taken with the drawings illustrating an embodiment of the invention. The invention is defined in the claims, and variations in structural details can of course be adopted without alteration of any of the essential novel characteristics.

Figure 1:
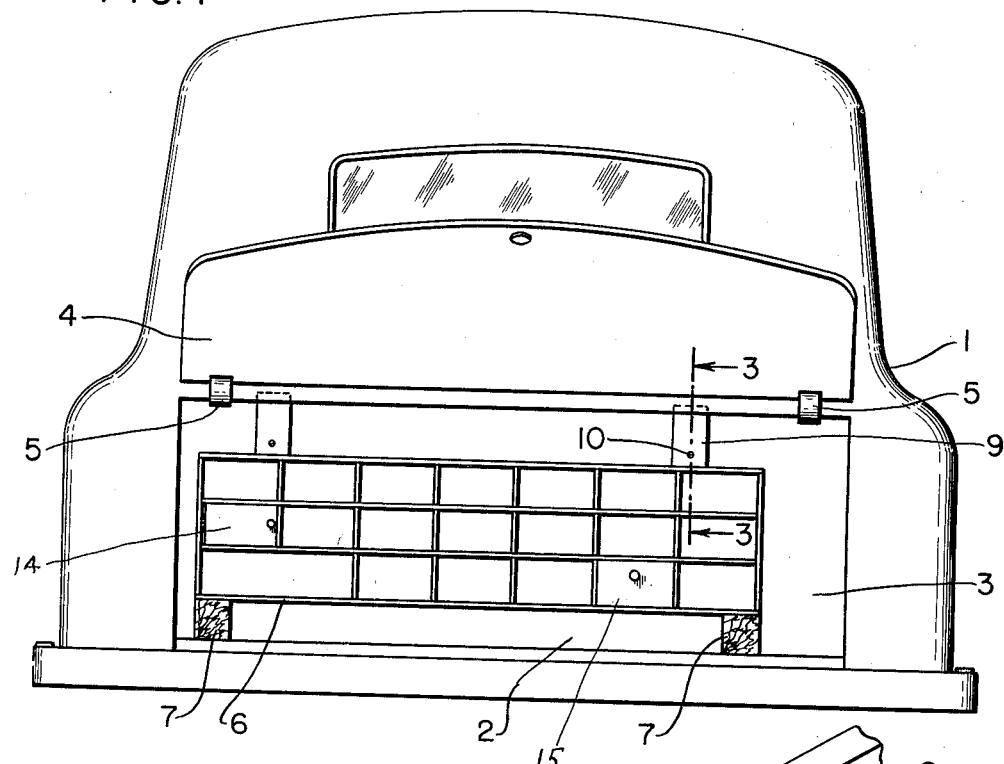
Figure 1 is a rear view showing an automobile with a trunk space containing my invention.
Figure 3:
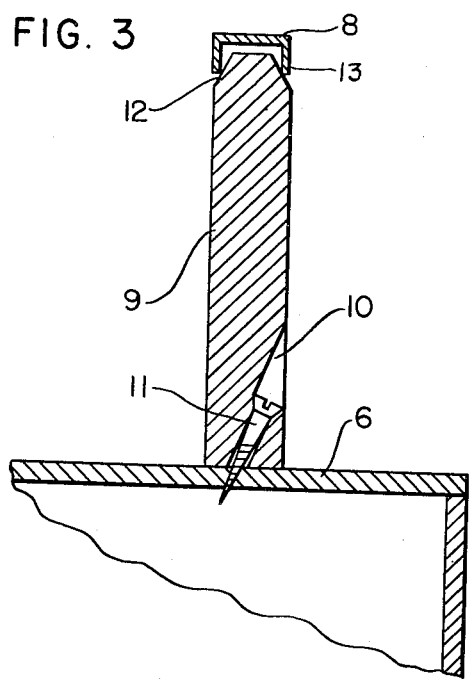
Figure 3 shows the same means in vertical section.
Figure 2:
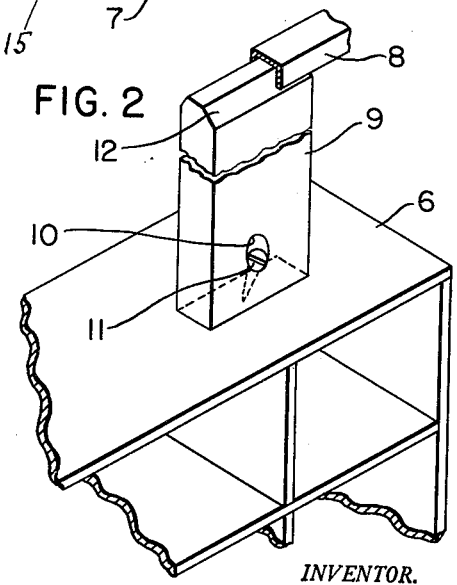
Figure 2 is a detail in perspective indicating how the receptacle is held fast in its place.

The body of the automobile 1 has a trunk space 2, with top, sides and bottom. This space or storage compartment is at the rear, and gives access through an opening 3 having a door 4 hinged at 5 to the body along the upper edge of the opening 3.

Within the compartment 2 is a receptacle or cabinet 6, supported on blocks 7 on the floor of the compartment. This cabinet may occupy the compartment fully or leave as much room as may be desired over it or at one end for such other articles as the compartment should receive. It is held against motion when the car is under way by connection with a fixed reinforcing member 8 which extends across the compartment 2 along the edge of the opening 3 adjacent the hinges 5.

This member 8 has the form of an inverted channel-shaped strip, and is engaged by the upper ends of blocks 9 on the cabinet 1. These blocks have wide front and rear faces parallel to the front and back edges of the receptacle 6, and in each block is a bore 10, extending from the wide face downward at an incline through the bottom of the block. The bores receive screws 11 which pierce the top of the cabinet 6 and hold fast to it. The bores 10 are of course in the rear faces of the blocks, so that the screws can easily be inserted or removed.

Each block is high enough to extend from the cabinet up to the strip 8 and is so situated as to be directly beneath the strip. The wide faces are bevelled transversely along their upper edges as indicated at 12, and have wedging engagement with the side flanges 13 of the strip. The chest 6 is put into place and the blocks 9 are then stood on the cabinet with their bevelled ends 12 snugly in the channel of the strip, and the screws 10 are next inserted in the bores 11 and turned till they are fast. The length of the blocks is such as to make them fit tightly between the chest and the strip 8.

Thus the receptacle can be readily mounted in the space 2, and disconnected at will for removal. This cabinet can be of any design, with chambers or "pigeon holes" for all kinds of articles, doors 14 if desired, and drawers 15. The chambers of course can be of any size, with some small, some large, to suit the owner.

The blocks 7 can of course be omitted and the cabinet placed directly on the floor of the body 1. Also the invention is not limited to passenger autos, but can be used on other types of motor cars also.

1. The combination of a body having a storage compartment with sides, top and bottom, and a hinged door for access thereto, said body having a transverse inverted channel-shaped reinforcing member at the top adjacent the hinged door, and a receptacle on the bottom of said compartment, blocks on top of said receptacle having wide faces parallel to said member, with inclined bores in said faces opening through the lower ends of the blocks, and screws in said bores engaging the top of said receptacle to affix said blocks thereon, said blocks extending up to said member and having bevelled upper ends in wedging engagement therewith between the flanges thereof to hold said receptacle against movement in said compartment.

2. A receptacle to be located in a storage compartment, said receptacle having blocks on its top, the blocks having wide faces parallel to the opposite edges of the receptacle and inclined bores extending through said faces and the lower ends of said blocks, and screws in said bores engaging the top of said receptacle, the upper ends of said blocks being bevelled across said faces, to engage a transverse channel-shaped member at the upper part of said compartment to hold said receptacle against movement in said compartment.

3. The combination of a body having a storage compartment with sides, top and bottom, and a hinged door for access thereto, said body having a transverse inverted channel-shaped reinforcing member at the top adjacent the hinged door, and a receptacle on the bottom of said compartment, blocks on top of said receptacle having relatively wide faces, means for affixing said blocks to the top of said receptacle to hold said blocks thereon, said blocks extending up to said member and having tapered upper ends in wedging engagement therewith between the flanges thereof to hold said receptacle against movement in said compartment.

ROBERT A. KATZ.

REFERENCES CITED

The following references are of record in the file of this patent:

UNITED STATES PATENTS

| Number | Name | Date |
|---|---|---|
| 1,434,350 | Collins | Oct. 31, 1922 |
| 1,837,596 | Taylor | Dec. 22, 1931 |
| 2,024,049 | Mohan | Dec. 10, 1935 |
| 2,194,993 | Wuest | Mar. 26, 1940 |
| 2,483,478 | Smelker | Oct. 4, 1949 |